United States Patent
Fasen et al.

(10) Patent No.: US 6,747,462 B2
(45) Date of Patent: Jun. 8, 2004

(54) METHOD AND SYSTEM FOR DETERMINING POSITION OF A BODY

(75) Inventors: Donald J. Fasen, Boise, ID (US); Charles David Smith, Meridian, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 107 days.

(21) Appl. No.: 10/100,204

(22) Filed: Mar. 18, 2002

(65) Prior Publication Data

US 2003/0173981 A1 Sep. 18, 2003

(51) Int. Cl.[7] ............................................. G01R 27/26
(52) U.S. Cl. ..................... 324/662; 324/660; 324/661; 324/686
(58) Field of Search ................. 324/660, 662, 324/686, 661

(56) References Cited

U.S. PATENT DOCUMENTS

| | | | | |
|---|---|---|---|---|
| 4,661,756 A | * | 4/1987 | Murphy et al. | 318/701 |
| 5,513,539 A | * | 5/1996 | McLaughlin et al. | 73/865.9 |
| 6,133,743 A | | 10/2000 | Gleixner et al. | 324/683 |
| 6,304,091 B1 | | 10/2001 | Shahoian et al. | 324/662 |

* cited by examiner

*Primary Examiner*—Anjan K. Deb
*Assistant Examiner*—John Teresinski

(57) ABSTRACT

A method for determining the position of a rotor with respect to a stator. The method includes generating offset N and Q signals when the rotor moves with respect to the stator and sampling the N and Q signals at a predetermined time interval. A section of a polar plot in which the N and Q signal sample lies is determined and compared to the section of a polar plot in which a previous N and Q signal sample lies. A long range rotor position is calculated by maintaining a count of the change of sections from previous N and Q signal samples. A sub-section rotor position for the N and Q signal sample is calculated and combined with the long range rotor position to create a linear position signal.

31 Claims, 10 Drawing Sheets

| pN | pQ | \|N\|>\|Q\| | R | SQ | CntQuad | CntOctal |
|---|---|---|---|---|---|---|
| 0 | 0 | 0 | \|N\|/\|Q\| | SQr | 0 | 0 |
| 0 | 0 | 1 | \|Q\|/\|N\| | P/2-SQr | 0 | 1 |
| 0 | 1 | 1 | \|Q\|/\|N\| | SQr | 1 | 2 |
| 0 | 1 | 0 | \|N\|/\|Q\| | P/2-SQr | 1 | 3 |
| 1 | 1 | 0 | \|N\|/\|Q\| | SQr | 2 | 4 |
| 1 | 1 | 1 | \|Q\|/\|N\| | P/2-SQr | 2 | 5 |
| 1 | 0 | 1 | \|Q\|/\|N\| | SQr | 3 | 6 |
| 1 | 0 | 0 | \|N\|/\|Q\| | P/2-SQr | 3 | 7 |

Fig. 7

METHOD AND SYSTEM FOR DETERMINING POSITION OF A BODY

THE FIELD OF THE INVENTION

The present invention generally relates to sensing devices, and more particularly to absolute position sensing devices with a high sensing resolution.

BACKGROUND OF THE INVENTION

Position sensors are used in a variety of devices to allow electrical systems to sense the motion or position of moving objects and components. Types of position sensors include, for example, analog potentiometers, digital encoders and capacity sensors, among other types of position sensors. These types of sensors may be used to track motion and position over a wide range of distances, and may have a similarly wide range of sensing resolutions. A position sensor's sensing resolution determines the incremental amount of motion or displacement detectable by the sensor. For example, a higher sensing resolution allows the censor to detect smaller increments of movement.

In some instances when tracking the movement and position of a component, it may be necessary or desirable to have a very high sensing resolution relative to the distance over which the position must be tracked. For example, one possible use of high resolution position sensors may be seen in the U.S. Pat. No. 5,557,596 to Gibson et al., in which an ultra high-density storage device is described and claimed. The ultra high-density storage device of Gibson et al. uses field emitters which generate electron beam currents. The electron beam currents write information onto storage areas of a storage medium. The storage medium is positioned on a movable rotor. The rotor is moved by one or more micromovers with respect to the field emitters so that the emitters can write and access information at a number of storage areas on the storage medium.

To properly control the micromovers for high-resolution devices such as the high-density storage device of Gibson et al., a position sensor capable of accurately indicating the relative position of the rotor with respect to the emitter wafer is needed. The sensor must indicate the position of the rotor over the entire stroke of the micromover (perhaps on the order of 50 to 100 $\mu$m), yet supply resolution down to a small percentage of a track width (perhaps on the order of 0.01 to 0.10 $\mu$m).

SUMMARY OF THE INVENTION

A method for determining the position of a rotor with respect to a stator is described herein. The method includes generating offset N and Q signals when the rotor moves with respect to the stator and sampling the N and Q signals at a predetermined time interval. A section of a polar plot in which the N and Q signal sample lies is determined and compared to the section of a polar plot in which a previous N and Q signal sample lies. A long range rotor position is calculated by maintaining a count of the change of sections from previous N and Q signal samples. A sub-section rotor position for the N and Q signal sample is calculated and combined with the long range rotor position to create a linear position signal.

BRIEF DESCRIPTION OF THE DRAWINGS

FIG. 7 is an NQ combiner table used in one embodiment of the invention.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

A calibrated position sensor based on a capacitance measurement can be used as a suitable high resolution encoder. Capacitive position sensors typically detect changes in position by measuring capacitance between two relative moving pieces or components. That is, the charge of the capacitor is measured and used to calculate a relative position between the two components.

In a device like that described in Gibson et al., the capacitive plates can be positioned such that they do not consume areas preferred to be used for the storage medium and/or signal traces. For example, the in-plane or X-Y position of the rotor can be determined by mounting capacitor plates on the bottom surface of the rotor (opposite the storage medium) and on the device's stationary frame under the rotor. Of course, any other suitable location may be used for mounting the capacitive plates. As the rotor moves, the capacitive plates on the rotor move laterally with respect to the capacitive plates on the frame (i.e., the stator) to cause the area of overlap between the plates to vary as the rotor position varies.

Figure 1:
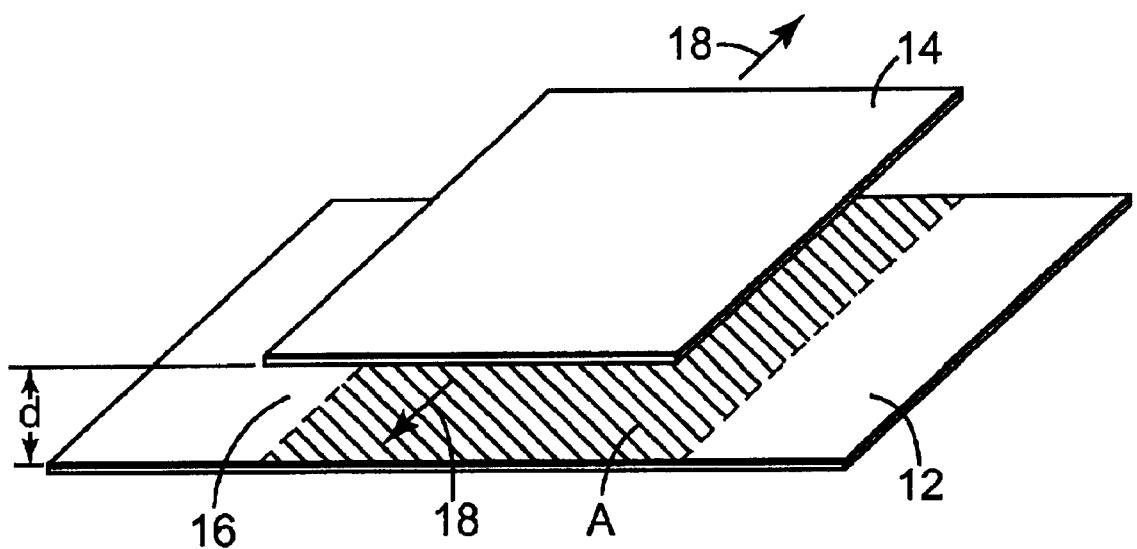
FIG. 1 is a perspective view of a generalized two plate capacitor.

FIG. 1 is a perspective view of a generalized capacitor 10. Two parallel electrically conductive plates 12 and 14 are separated by a distance d and have a dielectric material 16 between them, forming a capacitor whose capacitance value depends on the physical separation of the plates 12 and 14, the dielectric constant of the material between the plates, and the area of the plates 12, 14. If the plates 12, 14 are of unequal area or are shifted relative to each other while parallel, the capacitance is determined by the area of one plate projected onto the other when viewing the plates at a direction perpendicular to the planes of the plates 12, 14, i.e., the "overlap" area A between the plates. The capacitance is given by the equation:

$$C = AK/d$$

where A is the overlap area, K is the dielectric constant of the material 16 between the plates, and d is the plate separation. A variable capacitor thus provides a variable capacitance based on the size of the overlap area A, where the plates can be shifted relative to each other to change the size of area A, as indicated by arrows 18. The dielectric material 16 between plates 12, 14 may be any suitable dielectric material, including air.

Figure 2:
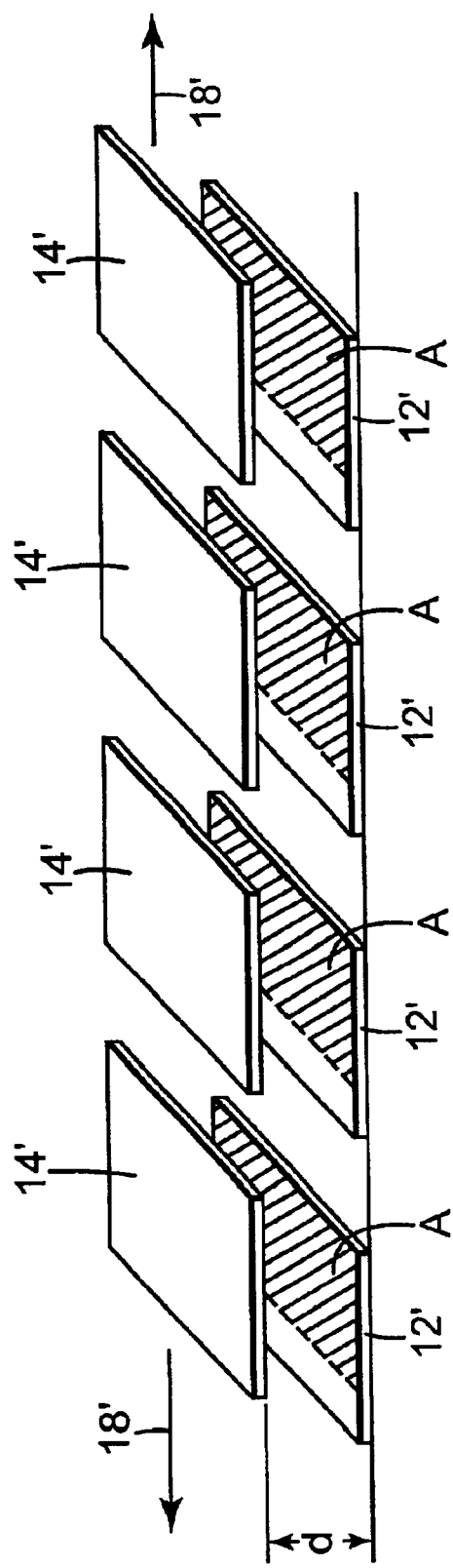
FIG. 2 is a perspective view of a generalized multi-plate capacitor.

To achieve high sensitivity in terms of capacitance per unit of movement (on the order of femtoFarad per micrometer (fF/$\mu$m) of lateral movement), multiple parallel conductive plates 12', 14' are commonly employed, such as illustrated in FIG. 2. In this case, the capacitance is given by the equation:

$$C = (n-1)AK/d$$

where n is the number of plates, A is the total overlap area of the plates, K is the dielectric constant of the material between the plates, and d is the plate separation. The plate arrangement of FIG. 2 will result in a capacitance that varies in a periodic or cyclic fashion with a linear change in position of the rotor (comprised of plates 14') as the plates are shifted relative to each other as indicated by arrows 18'.

Figure 3:
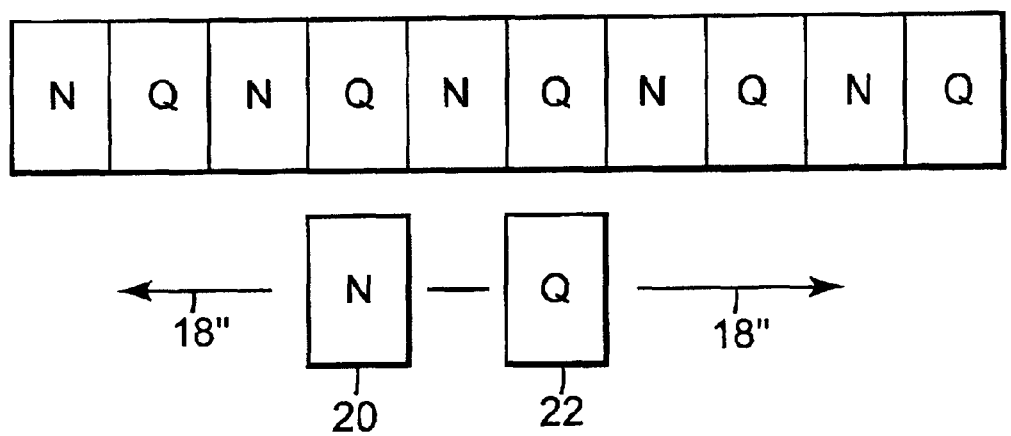
FIG. 3 is an illustration of two sets of capacitive plates arranged such that when one set of plates reaches a point of minimum sensitivity, the other set of plates have maximum sensitivity.

Because the capacitance of a multi-plate system varies in a periodic or cyclic fashion, there will be positions of the rotor for which the incremental capacitance change will be zero and no useful position information can be detected. A common method to solve this problem, illustrated in FIG. 3, is to employee two sets of capacitor plates with an offset between the sets of the plates. In one such arrangement, the plates are offset such that when one set of plates 20 (referred to as Normal or N) reaches a point of minimum sensitivity as a function of position, the other set of plates 22 (referred to as Quadrature or Q) have maximum sensitivity as a function of position. Conversely, when the Quadrature plates 22 are at a minimum sensitivity as a function of position, the Normal plates 20 have maximum sensitivity as a function of position. This type of arrangement will result in offset signals N and Q that vary in a periodic or cyclic fashion with a linear change in the position of the rotor in the direction of arrows 18''.

The difficulty in using an arrangement like that in FIG. 3 lies in properly combining the cyclic N and Q signals into a useful linear position signal representative of the linearly changing position of the rotor. A common method of combining the N and Q signals simply selects one or the other of the signals depending upon which is farthest from a peak or valley in its cyclic variation. As the N and Q signals vary, the system switches from one signal to the other. This method suffers from the presence of discontinuous behavior at the switch points, which can result in erroneous determination of the rotor position. Also, corrections for non-linearities in the sensor is difficult to achieve.

Figure 4:
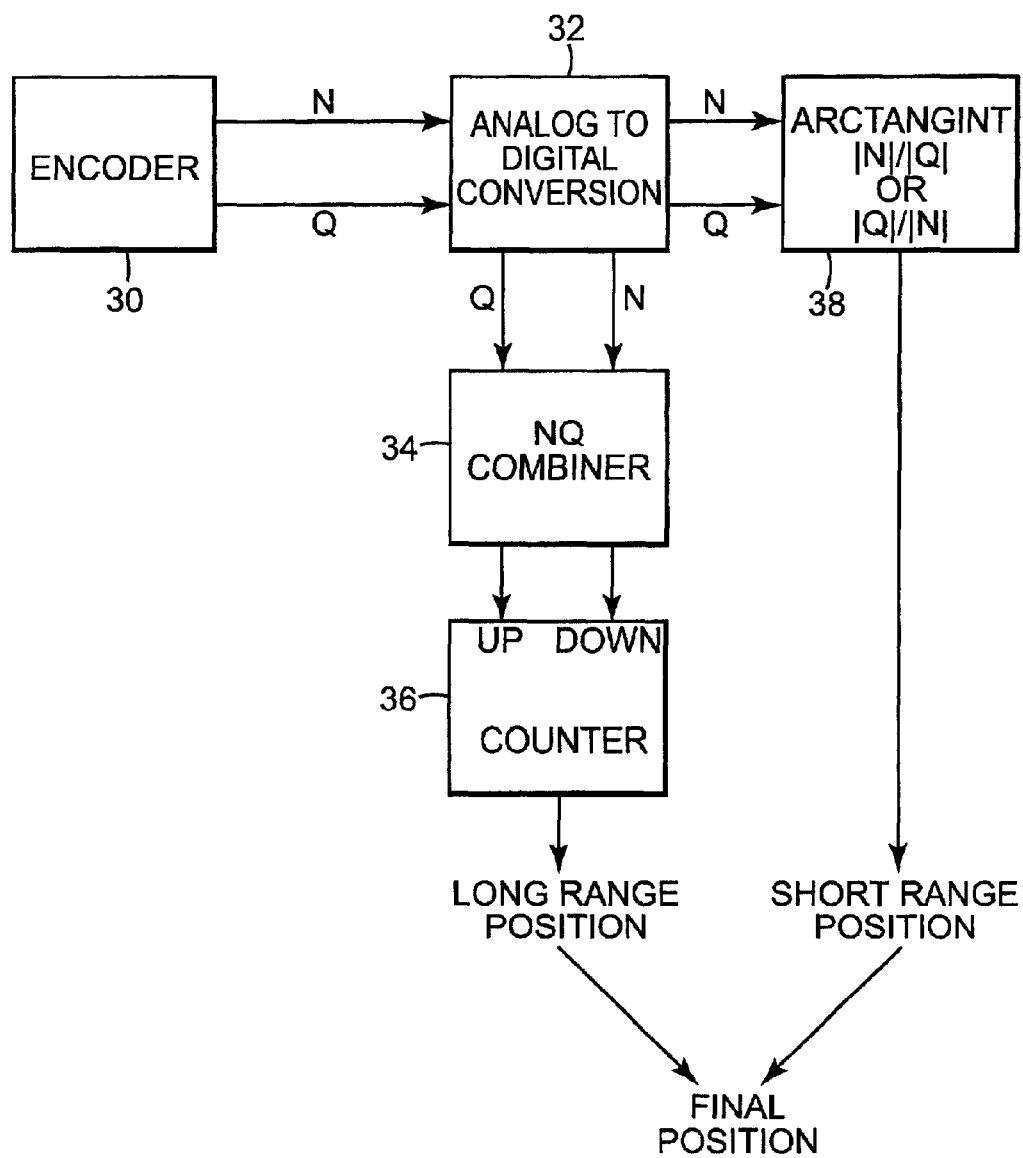
FIG. 4 is a flow chart illustrating the system and method of one embodiment of the invention.

As illustrated in FIG. 4, the system and method for determining position employed by one embodiment of the present invention converts both the N and Q signals into digital signals, such as by an analog to digital converter (ADC), and then combines the signals. Since the N and Q signals are converted to digital signals, they do not change during the process of determining the rotor position. Changes in the N and Q signals during the position calculation are a significant difficulty with an analog approach to combining the N and Q signals.

As described in greater detail below, in one embodiment of the invention, an encoder 30, such as a multi-plate capacitive sensor, generates signals N and Q as a result of movement by a body. The N and Q signals are converted to digital signals by an analog to digital converter 32. The digitized N and Q signals are combined using an NQ combiner table 34, and then a long range position or distance traveled is computed by using a counter 36 to maintain a count of movements of the combined signal. A short range (or high resolution) position or distance traveled is calculated by using linear interpolation from an arctangent lookup table 38, using the value of $|N|/|Q|$ or $|Q|/|N|$. The long range and short range positions are then combined to determine the final position of the moving body.

In one embodiment of the present invention, the N and Q signals can be viewed as a sine and cosine wave, respectively, so that $N = A\sin(x)$ and $Q = A\cos(x)$, where x is the linear position of the rotor. Given this knowledge about the shape of the N and Q signals, a linear position signal may be generated by converting the N and Q signals into the argument x. This can be done by reversing $N/Q = \tan(x)$ to get $x = \arctan(N/Q)$.

Practically, the N and Q signals will not to be perfect sine and cosine waves. To correct for distortions in the shape of the N and Q signals, a table representing $\arctan(R)$ is used, where $R = |N|/|Q|$ when N is near 0, and $R = |Q|/|N|$ when Q is near 0, where "||" indicates that the absolute values of the N and Q signals are used. This ensures that the ratio R is well behaved and limits the range required of the divider and the arctangent table.

Figure 5:
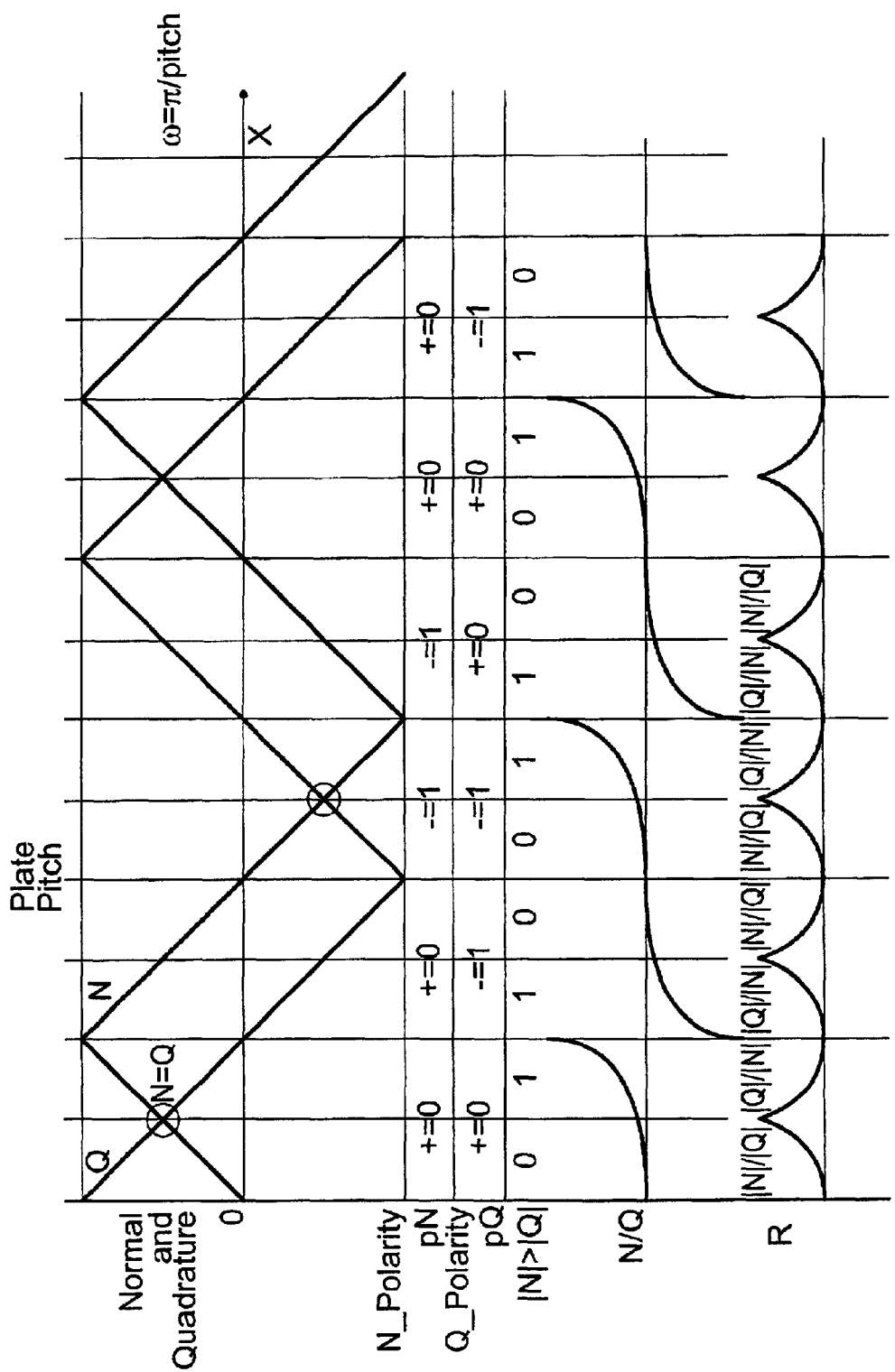
FIG. 5 is a plot of an illustrative set of periodically varying signals obtained from two sets of capacitive plates arranged as in FIG. 3.

FIG. 5 illustrates a triangle wave representation of the N and Q signals. Other data regarding the N and Q signals as a function of time is also shown in FIG. 5: the polarity of N (pN) and the polarity of Q (pQ), where 0 indicates a positive polarity and 1 indicates a negative polarity; whether $|N| > |Q|$, where 0 is false and 1 is true; the value of N/Q; and the value of R, where $R = |N|/|Q|$ when N is near 0, and $R = |Q|/|N|$ when Q is near 0. Selecting the inputs into the R divider in this way ensures that inputs to the digital divider are always positive and that the result R ranges from 0 to 1. When an arctangent table is generated for this wave shape, the resulting position signal is still linear, as will be shown below.

Figure 6:
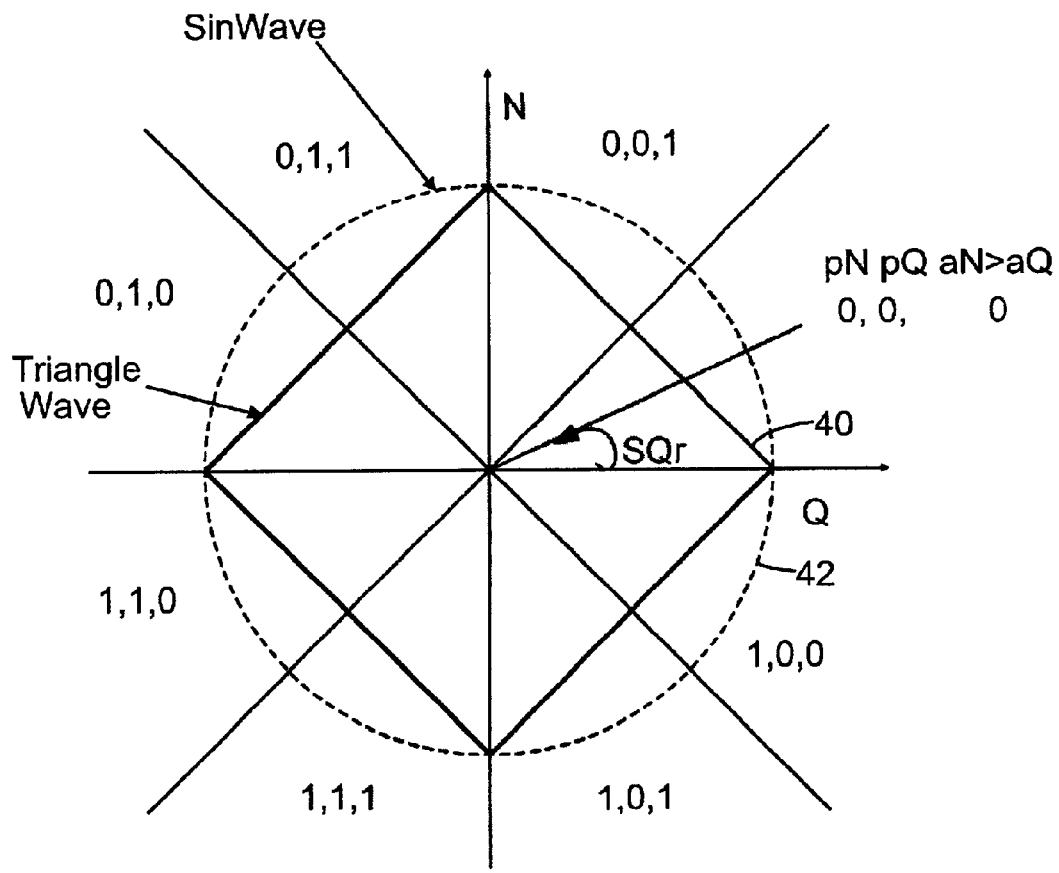
FIG. 6 is a polar plot of the periodically varying signals shown in FIG. 5.

A polar plot of the N and Q signals of FIG. 5 is presented in FIG. 6. As can be seen in FIG. 6, the triangular waveform of the N and Q signals in FIG. 5 creates a diamond trajectory 40. If N and Q were perfect sine and cosine waves, the trajectory would appear as the dashed circle 42 in FIG. 6.

From FIG. 5, the polarity of N (pN), the polarity of Q (pQ), and whether $|N| > |Q|$ are known as a function of time for the N and Q signals. From this data, eight unique conditions (see the table in FIG. 7, discussed in greater detail below) can be identified, and it can easily be determined into which section of the polar plot (FIG. 6) a particular sample NQ (taken at a time $t_0$ through $t_n$) of the N and Q signals falls. Also from FIGS. 5 and 6, it can be seen that an angular displacement of 90° ($\pi/2$ radians) equates to one half of the plate pitch P. By determining the section (quadrant and/or octal in this illustration) in which the plot of N and Q falls for each successive sample and then keeping a count of the change in sections, a long range, low resolution position of the rotor can be calculated. For example, if the trajectory of N and Q causes the quadrant in which the sample is plotted to successively change four times in the same direction, it can be determined that the trajectory of the plot moved through an angle between 360° and 450° (2π and 5π/2 radians). It can then be calculated that the position of the rotor changed between 2P and 5P/2.

As can be seen, maintaining a count of the change of quadrants provides a sensing resolution of P/2. To obtain a higher sensing resolution of P/4, a count of the change in octals could be maintained. For example, if the trajectory of N and Q causes the octal in which the sample is plotted to successively change 6 times in the same direction, it can be determined that the trajectory of the plot moved through an angle between 270° and 315° (3π/2 and 7π/4 radians). It can then be calculated that the position of the rotor changed between 3P/2 and 7P/4.

However, a sensing resolution equivalent to one quarter of the plate pitch (P/4) may still be lower than that required for many applications, such as for use in a data storage device as discussed above, where a sensing resolution in the range of 0.01 $\mu$m to 0.1 $\mu$m may be required. At such high sensing resolutions, when using only a count of the change in octals to determine position, the pitch of the plates would need to be on the order of 0.04 $\mu$m to 0.4 $\mu$m. While it may be possible to produce a plate pitch having these dimensions, doing so reliably is technically difficult and expensive. It would thus be desirable to obtain a sensing resolution greater than one quarter of the plate pitch.

The table in FIG. 7, referred to herein as an NQ combiner table, shows the eight unique conditions identifiable using the polarity of N (pN), the polarity of Q (pQ), and whether |N|>|Q|. The eight unique conditions correspond to the octal in which the plot of N and Q falls. In the table of FIG. 7, the octals are given count numbers (CntOctal) of 0 through 7. The eight octal count numbers likewise correspond to four quadrant count numbers (CntQuad) of 0 through 3. As illustrated above, by counting the number of times the plot of N and Q moves to a different octal or quadrant, the long range position of the rotor may be calculated. To accurately maintain a count of the number of times the plot of N and Q moves to a different octal or quadrant, sampling of N and Q must occur at a frequency high enough that the plot of N and Q does not move more than one quadrant count or octal count (depending upon which is being counted) between samples The table of FIG. 7 shows the case where the long-range position information is generated by maintaining a count of the change in the count quadrant (CntQuad) from one sample to the next. The sub-quadrant position (SQ) is generated from the arctangent lookup table (in the manner further described below) and combined with the long-range position to create a linear, high-resolution position signal. It will be recognized that the same method may be employed, using a count of the change in the octal count from one sample to the next, with appropriate changes to the values of SQ in Table 1.

As noted above, R=|N|/|Q| when N is near 0, and R=|Q|/|N| when Q is near 0. Using the value of R designated in Table 1 for particular values of pN, pQ and |N|>|Q|, the sub-quadrant position (SQ) may be extracted from the table and is equal to either SQr or P/2−SQr, where SQr=P arctan(R)/π, where P is the pitch spacing of the capacitive plates. Because the shape of the N and Q signals will not be perfectly sinusoidal, nor perfectly linear in the case of a triangular waveform, the calculation of the value of arctan(R) may be done with a look-up table. A look-up table can compensate for irregularities in the shapes of the N and Q signals.

To limit the number of arctangent table entries that must be stored in the look-up table, a linear interpolation is performed to determine the SQr value from two adjacent table entries. The value of R calculated in Table 1 is truncated until it matches a look-up table entry R1. R1 is used as the table index and contains SQr1. The next higher table index R2 contains SQr2. The linear interpolation calculates the value of SQr as:

$$SQr=(SQr2-SQr1)(R-R1)+SQr1$$

where R is scaled so that it ranges over the number of table entries, i.e., for 128 table entries R ranges from 0 to 128, rather than from 0 to 1. The calculated value of SQr is then used to calculate SQ as dictated by Table 1.

The arctangent table look-up method will have errors due to the limited number of table entries, as well as the fixed word widths available in the table contents and the divider. The magnitude of this error using linear interpolation in a 128 entry lookup table can be shown to be negligible. For example, for a multi-plate system having a pitch (P) and a 128 entry look-up table:

SQra=arctan(R)(radians)

SQr=(P)(SQra)/π(distance)

ΔR=1/127=0.0079

SQra1=arctan(R1)

SQra2=arctan(R1+ΔR)

IntSQra=(SQra1+SQra2)/2

ActSQra=arctan(R1+ΔR/2)

ErrSQra=ActSQra−IntSQra where ΔR is the incremental change between successive look-up table entries, SQra1 is the first table value, SQra2 is the second (adjacent) table value, IntSQra is the midpoint using interpolation, ActSQra is the actual midpoint, and ErrSQra is the error between the actual and interpolated midpoints.

Using the above equations, a pitch of 5.04 $\mu$m and randomly selecting values of R1 between 0 and 1:

| R1 | SQra1 | SQra2 | IntSQra | ActSQra | ErrSQra ($\mu$rad) | Error (pm) |
| --- | --- | --- | --- | --- | --- | --- |
| 0.5700 | 0.5181 | 0.5240 | 0.5210 | 0.5210 | 5.03 | 8.08 |
| 0.5200 | 0.4795 | 0.4857 | 0.4826 | 0.4826 | 5.00 | 8.02 |
| 1.0000 | 0.7854 | 0.7893 | 0.7874 | 0.7874 | 3.86 | 6.19 |

From the table above, it can be seen that using linear interpolation from a 128 entry table would produce an error of approximately 8 picometers (0.008 nm or 8×10$^{-6}$ $\mu$m) when the capacitive plates have a pitch of approximately 5 $\mu$m. That is, the error is approximately 1.5/1,000,000 of the pitch.

Figure 8:
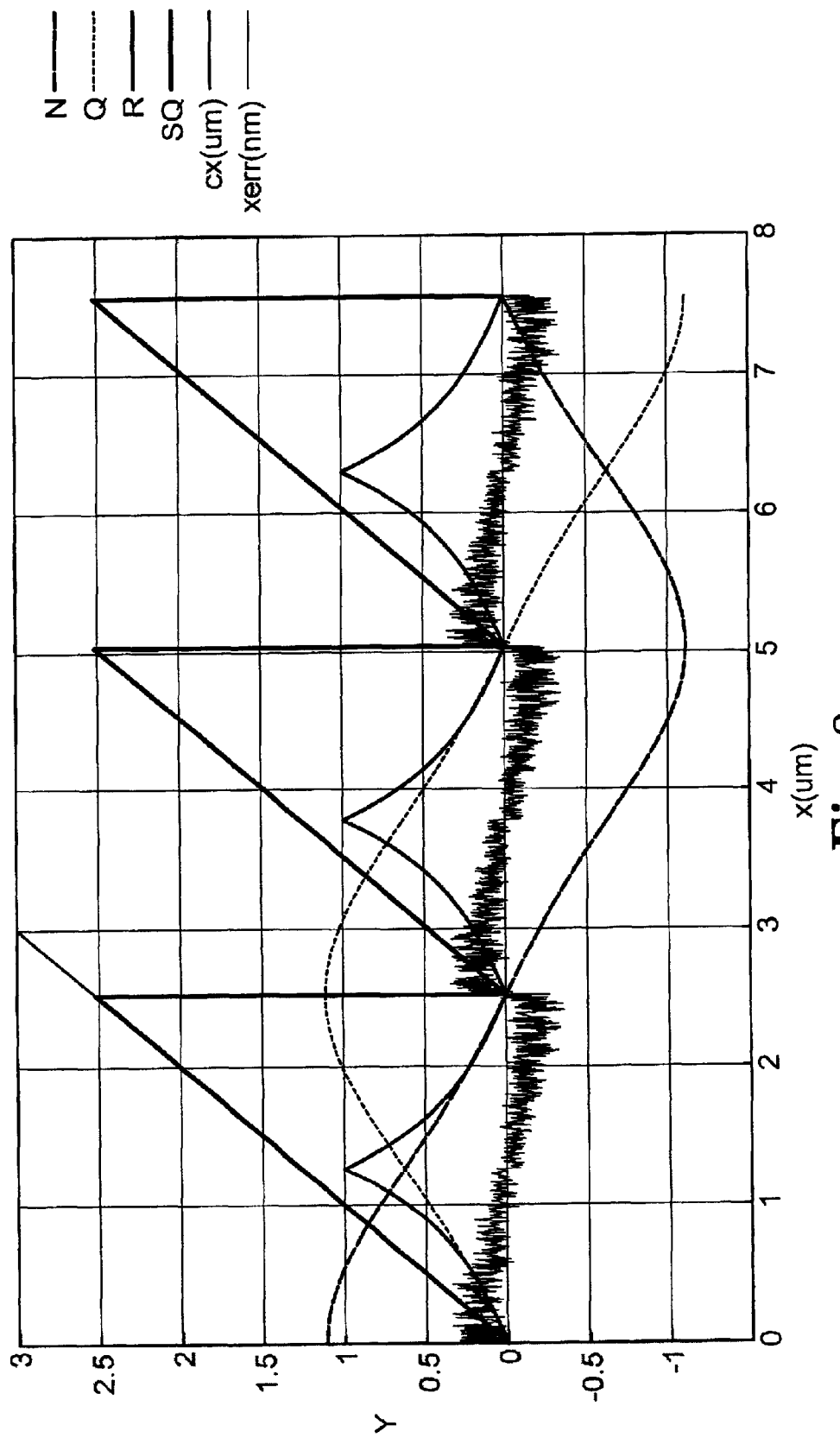
FIG. 8 is a graph illustrating the creation of a linear position signal using the system and method of one embodiment of the invention, prior to quantizing the signal data.

FIG. 8 provides a graphic illustrating a simulation using the method described above and a plate pitch of 5.04 $\mu$m. It can be seen that a linear position signal (cx) results, with a very small position error (xerr) that hovers close to zero. It should be noted that the scale of linear position signal (cx) is in micrometers ($\mu$m), while the scale of position error (xerr) is in nanometers (nm)

Figure 9:
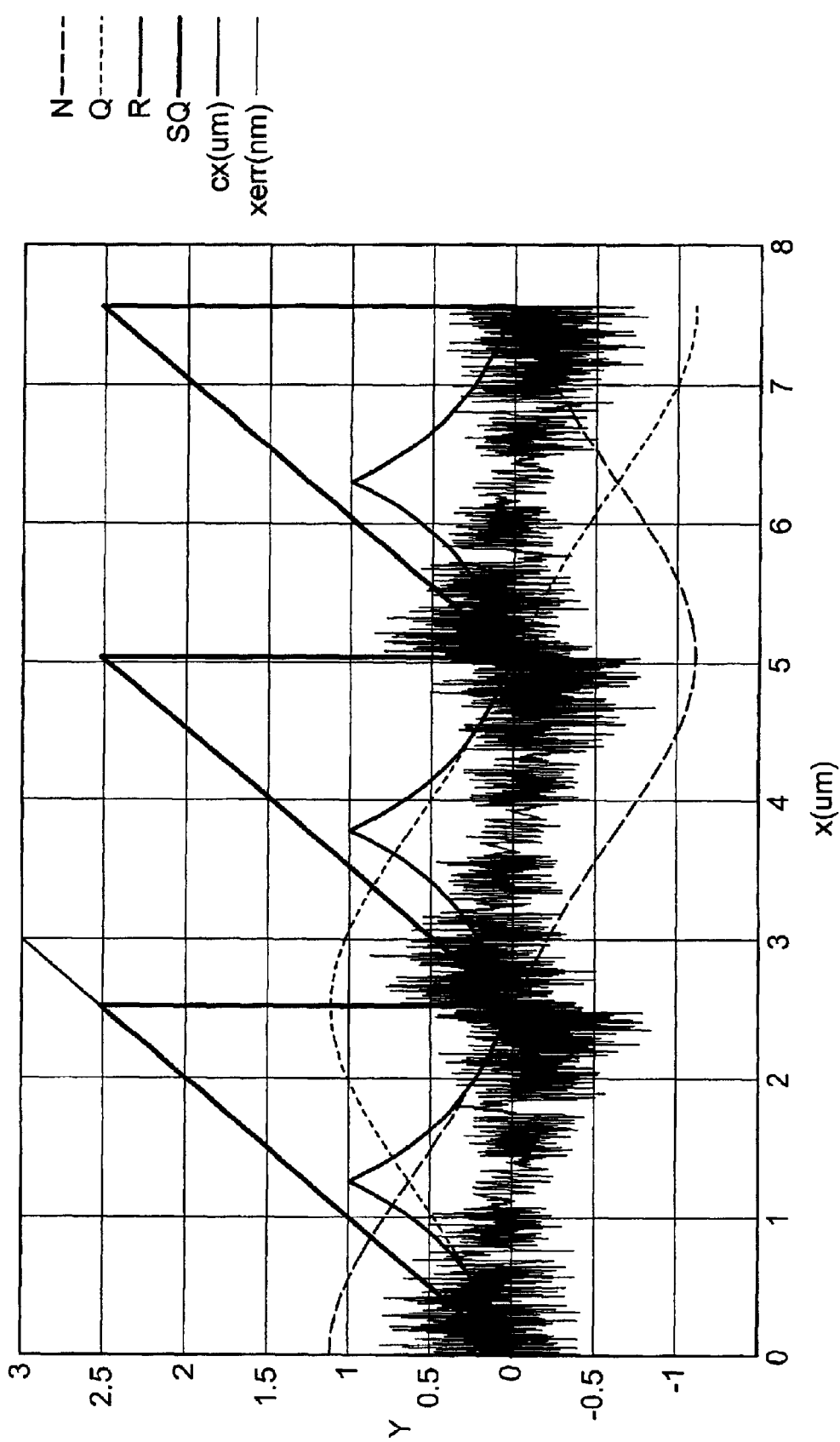
FIG. 9 is a graph illustrating the creation of a linear position signal like using the system and method of one embodiment of the invention, after quantizing the signal data

FIG. 9 shows the same data as FIG. 8, but after the data has been quantitized using a 12 bit analog to digital conversion, and including look-up table errors. Again, a linear position signal (cx) results, with only a small increase in the position error (xerr).

A key limitation in creating a useful X-Y position sensor is the variation in spacing d between capacitor plates. Plate spacing variations may occur whenever the micromover is commanded to move the rotor or when the rotor undergoes external shock and vibration. Variation in the plate spacing causes a corresponding change in the capacitance of the system. Unfortunately, the capacitance variation caused by the plate spacing variation is indistinguishable from the desired area variation, and will thus be misinterpreted as a lateral position change of the rotor if it is not removed from the detected signal.

In the method described herein, using a small signal analysis technique, the divide operation done in the NQ combiner cancels the effect of the gap variation, shown as follows:

For $SQ \propto Q/N$, where $Q = K \text{AreaQ}(x)/d$ and $N = K \text{AreaN}(x)/d$, then $SQ \propto \text{AreaQ}(x)/\text{AreaN}(x)$, as desired, with no effect from gap d, where K is the dielectric constant of the material between the plates, AreaN(x) and AreaQ(x) are the overlap areas for the N and Q sets of plates at linear position x, respectively, and d is the plate separation.

Figure 10:
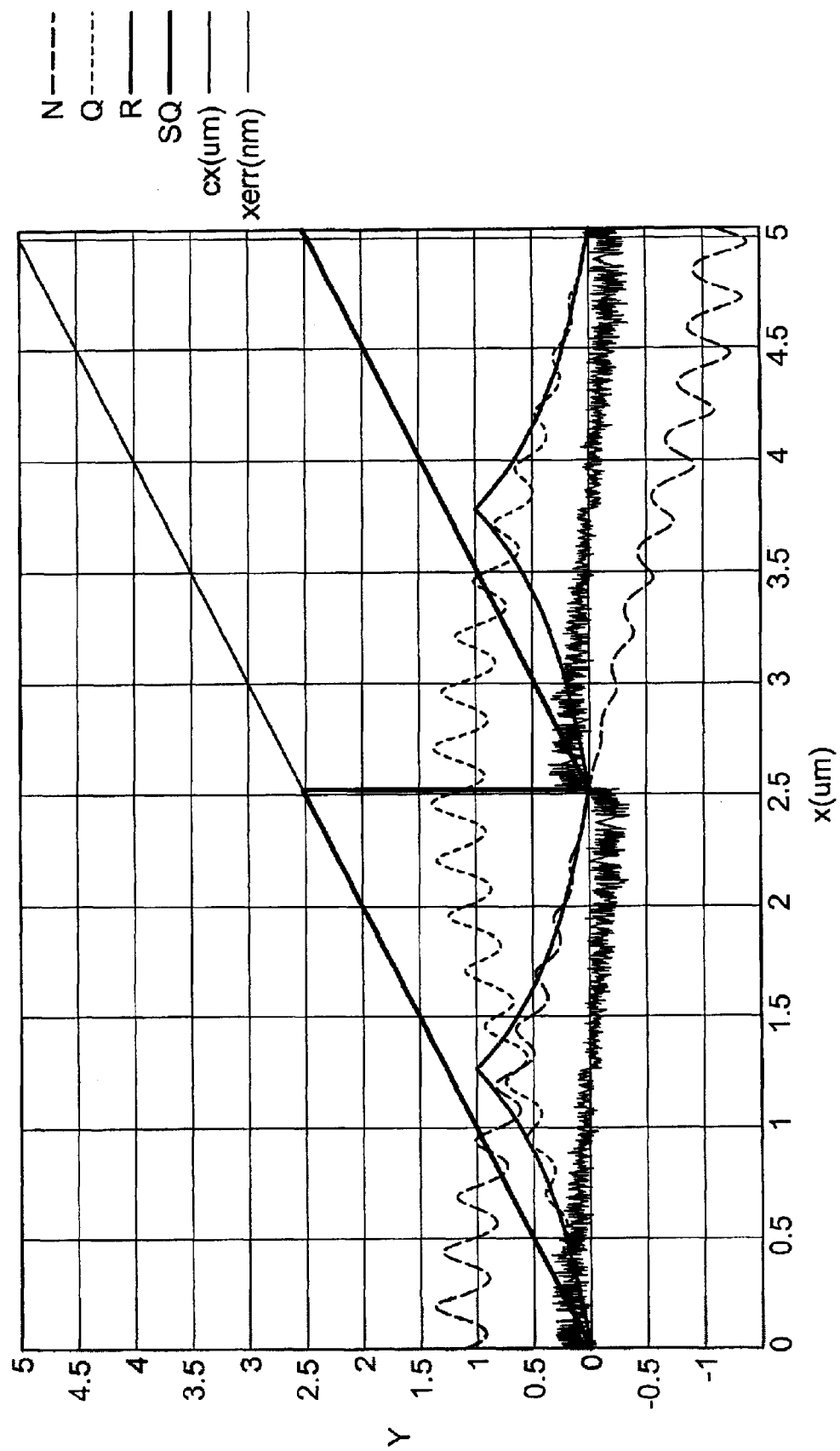
FIG. 10 is a graph illustrating the effect of high frequency modulation of the signal data.

FIG. 10 is a plot of N and Q signals with a high frequency sine wave modulating the capacitor spacing (such as if the system was subject to an external vibration). As can be seen from examining FIG. 10, there is no corresponding modulation in the linear position signal (cx) or in the position detector error (xerr).

The invention described herein thus provides a method for determining the position of a rotor with respect to a stator which provides a linear position signal, has a high sensing resolution as a function of plate pitch, accounts for irregularities in the input signals, and which is insensitive to variations in plate spacing.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method for determining the position of a rotor with respect to a stator, comprising:
   generating offset Normal (N) and Quadrature (Q) signals when the rotor moves with respect to the stator;
   sampling the N and Q signals at a predetermined time interval;
   calculating a section of a polar plot in which the N and Q signal sample lies;
   counting the change of sections from prior N and Q signal samples to determine a long range rotor position;
   calculating a sub-section rotor position for the N and Q signal sample; and
   combining the long range rotor position with the sub-section rotor position to create a linear position signal indicative of the position of the rotor.

2. The method of claim 1, wherein generating the offset N and Q signals comprises:
   providing first and second sets of capacitive plates having a pitch P on the rotor and stator; and
   offsetting the first and second sets of capacitive plates to generate offset N and Q signals, respectively.

3. The method of claim 2, further comprising converting analog N and Q signals to digital signals.

4. The method of claim 2, wherein the first and second sets of capacitive plates are offset such that when the first set of plates reaches a point of minimum sensitivity as a function of position, the second set of plates have a maximum sensitivity as a function of position.

5. The method of claim 1, wherein the N and Q signals are cyclic as the rotor moves in a linear direction.

6. The method of claim 5, wherein the N and Q signals are sinusoidal wave forms.

7. The method of claim 5, wherein the N and Q signals are triangular wave forms.

8. The method of claim 1, wherein the section in which the N and Q signal sample lies is a quadrant of a polar plot.

9. The method of claim 1, wherein the section in which the N and Q signal sample lies is an octal of a polar plot.

10. The method of claim 1, wherein calculating a section of a polar plot in which the N and Q signal sample lies is accomplished using a combiner table.

11. The method of claim 10, wherein for each N and Q signal sample, the combiner table uses the polarities of the N and Q signals, and whether $|N| > |Q|$ to determine the section of a polar plot in which the N and Q signal sample lies.

12. The method of claim 1, wherein calculating a sub-section rotor position for the N and Q signal sample is accomplished using an arctangent look-up table.

13. The method of claim 12, wherein the arctangent look-up table is a 128 entry table.

14. The method of claim 12, wherein the sub-section rotor position is calculated using linear interpolation between adjacent arctangent look-up table entries.

15. A method for measuring the distance traveled by a rotor from time $t_0$ through $t_n$, comprising:
   generating offset N and Q signals that vary cyclically with the rotor position;
   sampling the N and Q signals at successive predetermined time intervals $t_0$ through $t_n$ to obtain signal samples $NQt_0$ through $NQt_n$;
   converting signal samples $NQt_0$ through $NQt_n$ to a polar coordinate system;
   determining in which section of the polar coordinate system each of signal samples $NQt_0$ through $NQt_n$ lies;
   counting the change of sections from signal samples $NQt_0$ through $NQt_n$;
   calculating a long range distance traveled by the rotor using the change of sections count;
   calculating a sub-section rotor distance for signal sample $NQt_n$; and
   combining the long range rotor distance with the sub-section rotor distance to measure the distance traveled by the rotor from time $t_0$ through $t_n$.

16. The method of claim 15, wherein calculating a sub-section rotor distance for signal sample $NQt_n$ uses the value $|N|/|Q|$ at time $t_n$.

17. The method of claim 16, wherein an arctangent look-up table is used to calculate the sub-section rotor distance.

18. The method of claim 17, wherein linear interpolation is used to calculate the sub-section rotor distance from the arctangent look-up table.

19. The method of claim 15, wherein the frequencies of the N and Q signals are proportional to the distance traveled by the rotor.

20. The method of claim 15, wherein the frequency of successive time intervals $t_0$ through $t_n$ is such that the location of successive samples of the N and Q signals does not change by more than one section.

21. The method of claim 15, wherein the section of the polar coordinate system is a quadrant of the polar coordinate system.

22. The method of claim 15, wherein determining in which section of the polar coordinate system each of signal samples $NQt_0$ through $NQt_n$ lies is accomplished using a combiner table.

23. The method of claim 22, wherein for each signal sample $NQt_0$ through $NQt_n$, the combiner table uses the polarities of the N and Q signals, and whether $|N|>|Q|$ to determine the section of the polar coordinate system in which each sample lies.

24. The method of claim 23, wherein the combiner table divides the polar coordinate system into eight discrete sections.

25. A capacitive position sensor system comprising:
   an encoder for generating offset N and Q signals as a rotor moves with respect to a stator;
   means for converting signal samples $NQt_0$ through $NQt_n$ to a polar coordinate system and determining in which section of the polar coordinate system each of samples $NQt_0$ through $NQt_n$ lies;
   means for counting the change of polar coordinate sections from sample $NQt_0$ through sample $NQt_n$ and calculating a long range distance traveled by the rotor;
   means for calculating a sub-section rotor distance for sample $NQt_n$; and
   means for combining the long range rotor distance and the sub-section rotor distance to measure the distance traveled by the rotor from time $t_0$ through $t_n$.

26. The system of claim 25, wherein the means for converting signal samples $NQt_0$ through $NQt_n$ to a polar coordinate system and determining in which section of the polar coordinate system each of samples $NQt_0$ through $NQt_n$ lies comprises a combiner table using the polarities of the N and Q signals, and whether $|N|>|Q|$.

27. The system of claim 25, wherein the means for calculating a sub-section rotor distance for sample $NQt_n$ comprises an arctangent look-up table using the value of $|N|/|Q|$ at time $t_n$.

28. The system of claim 27, wherein the means for calculating a sub-section rotor distance using an arctangent look-up table uses linear interpolation between entries in the look-up table.

29. The system of claim 25, wherein the N and Q signals are offset such that when the N signal reaches a point of minimum sensitivity as a function of position, the Q signal has a maximum sensitivity as a function of position.

30. The system of claim 25, wherein the encoder comprises:
   a first set of capacitive plates having a pitch P on the rotor and the stator for generating an N signal as the rotor moves; and
   a second set of capacitive plates having a pitch P on the rotor and the stator and offset from the first set of capacitive plates for generating a Q signal as the rotor moves.

31. The system of claim 25, further comprising means for converting analog N and Q signals to digital signals.

* * * * *